United States Patent
Pripps (10) Patent No.: US 12,402,634 B2
(45) Date of Patent: Sep. 2, 2025

(54) SANDWICH COOKIES HAVING FILLER CREAM LAYER CONTAINING A CONTINUOUS INTERIOR IMAGE, AND METHODS FOR MAKING SAME

(71) Applicant: Gregory Pripps, Butternut, WI (US)

(72) Inventor: Gregory Pripps, Butternut, WI (US)

( * ) Notice: Subject to any disclaimer, the term of this patent is extended or adjusted under 35 U.S.C. 154(b) by 716 days.

(21) Appl. No.: 17/765,465

(22) PCT Filed: Sep. 18, 2020

(86) PCT No.: PCT/US2020/051362
§ 371 (c)(1),
(2) Date: Mar. 31, 2022

(87) PCT Pub. No.: WO2021/067046
PCT Pub. Date: Apr. 8, 2021

(65) Prior Publication Data
US 2022/0338488 A1    Oct. 27, 2022

Related U.S. Application Data (60) Provisional application No. 62/908,653, filed on Oct. 1, 2019.

(51) Int. Cl.
*A21D 13/32* (2017.01)
*A21C 15/00* (2006.01)
*A21D 13/37* (2017.01)
*A21D 13/38* (2017.01)
*A21D 13/47* (2017.01)

(52) U.S. Cl.
CPC ............... *A21D 13/32* (2017.01); *A21C 15/00* (2013.01); *A21D 13/37* (2017.01); *A21D 13/38* (2017.01); *A21D 13/47* (2017.01)

(58) Field of Classification Search
None
See application file for complete search history.

(56) References Cited

U.S. PATENT DOCUMENTS

| | | |
|---|---|---|
| 4,469,021 A | 9/1984 | Rose et al. |
| 5,620,713 A | 4/1997 | Rasmussen |
| 9,788,559 B2 | 10/2017 | Smith |
| 2001/0024670 A1 | 9/2001 | Gehan et al. |
| 2004/0071839 A1 | 4/2004 | Hayes-Jacobson et al. |
| 2005/0196505 A1 | 9/2005 | Hayes-Jacobson et al. |
| 2011/0162536 A1 | 7/2011 | Mittal |
| 2013/0022713 A1 | 1/2013 | Hayes-Jacobson et al. |
| 2015/0135972 A1 | 5/2015 | Haas et al. |
| 2015/0305350 A1 | 10/2015 | Mihalos et al. |
| 2016/0015043 A1 | 1/2016 | Mihalos et al. |

OTHER PUBLICATIONS

International Search Report for corresponding PCT Application No. PCT/US2020/051362, dated Dec. 16, 2020 (2 pages).
Wall Street Journal "3-D printed Oreos" Media published on Mar. 13, 2014. Media retrieved from <https://www.youtube.com/watch?v=fZjR6pyTJsc>.
Christopher Schmitt "Custom Oreo Printing at SXSW" Media published on Mar. 8, 2014 retrieved from <https://www.youtube.com/watch?v=cM4d5VT06f0>.
Firkser "Whats Really in Oreo Cream Filling?" Oct. 30, 2017. Retrieved from <https://www.yahoo.com/lifestyle/really-oreo-cream-filling-135325663.html?fr=sycsrp_catchall>.
Wikipedia "Emulsion" Mar. 29, 2019, as cited in International Search Report.

*Primary Examiner* — Jyoti Chawla
(74) *Attorney, Agent, or Firm* — Weaver Legal and Consulting LLC (57) ABSTRACT

A sandwich cookie product has entertainment value by providing a filler cream layer that includes a continuous, predetermined interior image. The image is hidden by the base cakes, but can be discovered by a consumer when either base cake is removed. Because the complex image is continuous throughout the thickness of the filler cream layer, the sandwich cookie product provides entertainment value in discovery of the hidden image. Methods of making such products are described.

10 Claims, 3 Drawing Sheets

SANDWICH COOKIES HAVING FILLER CREAM LAYER CONTAINING A CONTINUOUS INTERIOR IMAGE, AND METHODS FOR MAKING SAME

CROSS-REFERENCE TO RELATED APPLICATIONS

This application is a Section 371 National Stage Application of International Application No. PCT/US2020/051362, filed Sep. 18, 2020 and published as WO 2021/067046 on Apr. 8, 2021, which claims priority from U.S. Provisional Patent Application Ser. No. 62/908,653 entitled "Sandwich Cookies Having Filler Cream Layer Containing a Continuous Interior Image, and Methods for Making Same" filed on Oct. 1, 2019, the contents of which are incorporated herein in their entirety for all purposes.

FIELD

Inventive concepts provide sandwich cookies having filler cream layers that contain a continuous interior image, methods of making such cookies, and intermediate products. The filler cream layer includes a complex, predetermined image that is continuous throughout the thickness of the filler cream layer, thereby providing entertainment value to sandwich cookies in which they are contained.

BACKGROUND

Filler creams (also referred to as "cremes" on product packaging) have been used in baked goods in a wide variety of ways, for example, as a layer or "sandwich" material between two cookie base cakes. Examples of such use are found in cookies marketed under the trademarks OREO®, NUTTER BUTTER®, SNACKWELL'S®, and many others.

Filler cream compositions generally include sugar, oils or fats, and flavoring. These ingredients can be varied to provide significantly different properties in a filler cream. Optional additives can improve qualities such as shelf life.

Sandwich cookies can be enjoyed by a consumer in a variety of ways. For example, many consumers enjoy twisting off a base cake to expose the filler cream layer, and then eating the filler cream either alone, or with the remaining base cake.

SUMMARY

Inventive concepts provide a new dimension of entertainment to the eating experience for sandwich cookies. Inventive sandwich cookies include a filler cream layer having an interior, complex image that is at least partially hidden within the sandwich cookie. This complex image is provided as a stable image that is continuously depicted throughout the thickness of the filler cream layer. Thus, even if a portion of the filler cream layer is adhered to the base cake as it is twisted off the sandwich cookie, the complex image remains visibly intact throughout the filler cream layer.

Inventive concepts thus provide novelty sandwich cookies that provide an added level of enjoyment for consumers. Inventive sandwich cookies include a hidden complex image that is revealed during the eating experience.

In accordance with inventive concepts, filler cream layers include a continuous, predetermined image that is visible on a top surface, a bottom surface, and throughout the thickness of the filler cream layer. In these aspects, the continuous image retains its detail and features throughout the thickness of the filler cream layer, so that it is visible no matter how the consumer ultimately views the image—after clean removal of a base cake, or even after some portion of the filler cream layer adheres to a base cake when the consumer removes it (such as by twisting the base cake off the sandwich cookie with slight tangential force applied at the perimeter of the base cake). The image within the cream layer is stable at capping (addition of a second base cake) to avoid distortion. Optionally, portions of the image can be visible at locations along the perimeter of the filler cream layer, providing an added enticement to discover the interior image. These novel products provide enhanced entertainment value to sandwich cookies, as the consumer can discover a hidden image within the cookie.

As used herein, "cream filling" includes any filling having a fat component, whether or not the filling has the actual consistency of a cream. The term is intended to include "crème fillings" as that term is required in US food labeling. One of skill in the art will readily appreciate the concepts described herein can be applied to similar fillings used in a sandwich format, such as reduced fat (or fat free) fillings, reduced sweetener (or sweetener-free) fillings (such as savory fillings), and the like. The sandwich format can include cookies and/or crackers as the base cakes.

In some implementations, filler cream compositions can be coextruded so as to include any sort of internal, predetermined image. In some aspects, inventive concepts include substantially simultaneous extrusion of at least two filler cream compositions to form filler cream units that include an interior image that represents a particular theme or event, such as a holiday, special occasion, sporting event or team, educational theme, popular character, and the like. The image is "predetermined" in that it is selected by a cookie maker, an extrusion nozzle is selected to provide that specific image, and the image is produced by the extrusion process within relatively tight tolerances. In these aspects, the "tolerance" can refer to the relative physical dimensions of the image details. These relative dimensions are maintained within minimal variation so that the final, complex image retains its details. The tolerance can also refer to the relative force of extrusion; finer details of the image will be extruded with lower pressure, while larger fields of the image will be extruded with relatively higher pressure.

In some implementations, methods for preparing a filler cream composition containing a predetermined image can use an ink jet printing method. In accordance with these aspects, filler cream composition can be pumped from a filler cream composition storage container through supply lines to a filler composition printer assembly. The printer assembly is used to deposit droplets of colored filling onto a surface. The surface may be a base cake (for single cookie production) or a ram base plate (for higher throughput operations). In these aspects, droplets are assembled to create the final image within a filler cream composition. In accordance with these implementations, an image is "predetermined" in that it is selected by a cookie maker, and an ink jet printer is programmed to produce that specific image within relatively tight tolerances.

In some implementations, methods for preparing a filler cream composition containing a predetermined image can utilize "murine" methods used in creating detailed designs within glass. In accordance with these methods, thin colored strips of filler cream composition can be deposited in a cylinder that has been divided lengthwise into halves. Typically, the filler cream composition strips are provided with a square shape to reduce gaps within the cylinder, since gaps can cause distortion of the final image. Strips of various colored filler cream compositions are laid down in sequence according to a desired, predetermined pattern within each half cylinder. Once each half cylinder is filled, the two halves are combined into a full cylinder, and the cylinder is introduced into a sizing chamber to reduce the filler cream composite rope until the desired size for a cookie is achieved. The composite rope can then be cut into a filler cream unit suitable for deposition onto a base cake.

Inventive concepts are in direct contrast to prior methods of depositing filler creams onto base cakes to form a sandwich cookie. In prior methods, filler creams are deposited in a set amount, but there is no specific provision or control over an image within the filler cream.

Inventive concepts relate to sandwich cookies comprising two base cakes and a filler cream layer positioned between the two base cakes, the filler cream layer comprising:
 (a) a first filler cream composition having a first color, and
 (b) a second filler cream composition having a second color,
  wherein both the first filler cream composition and the second filler cream composition comprise sweetener and an oleaginous composition,
  wherein the filler cream layer has a top surface and a bottom surface, and
  wherein the first filler cream composition and the second filler cream composition are coextruded to cooperatively define a continuous interior image from the top surface to the bottom surface of the filler cream layer.

In some implementations, inventive concepts relate to sandwich cookies comprising two base cakes and a filler cream layer positioned between the two base cakes, the filler cream layer comprising:
 (a) a first filler cream composition having a first color, and
 (b) a second filler cream composition having a second color,
  wherein both the first filler cream composition and the second filler cream composition comprise sweetener and an oleaginous composition,
  wherein the filler cream layer has a top surface and a bottom surface, and
  wherein the first filler cream composition and the second filler cream composition cooperatively define a continuous interior image from the top surface to the bottom surface of the filler cream layer. The first filler cream composition and second filler cream composition can be printed to cooperatively define a continuous interior image from the top surface to the bottom surface of the filler cream layer Optional features of inventive sandwich cookies include the following. The continuous interior image can comprise an image associated with a holiday, special occasion, sporting event or team, educational theme, or popular character. The sandwich cookie can further comprise any number of additional filler cream compositions having distinct colors, such as a third filler cream composition having a third color, a fourth filler cream composition comprising a fourth color, and so on. The interior image can be at least partially visible at its perimeter, providing an enticement to discover the full, hidden image.

In some aspects, the two base cakes can have an equal diameter and the filler cream layer has a diameter, and wherein the diameter of the filler cream layer is equal to or less than the diameter of the two base cakes.

In some implementations, the continuous interior image remains intact after a base cake is removed to reveal the image.

Also contemplated are methods of preparing a sandwich cookie comprising steps of:
 (a) providing a first filler cream composition having a first color and a second filler cream composition having a second color;
 (b) coextruding the first filler cream composition and second filler cream composition through an extrusion nozzle having interior orifices to produce a filler cream composite rope having a leading edge, and having a continuous interior image defined by the coextruded first filler cream composition and second filler cream composition;
 (c) placing a first base cake on the leading edge of the filler cream composite rope;
 (d) cutting the filler cream composite rope a distance from the first base cake to provide a filler cream layer on the first base cake; and
 (e) placing a second base cake onto the filler cream layer on a surface opposite the first base cake, thereby forming a sandwich cookie.

Also provided are methods of preparing a sandwich cookie comprising steps of:
 (a) providing a first filler cream composition having a first color and a second filler cream composition having a second color;
 (b) coextruding the first filler cream composition and second filler cream composition through an extrusion nozzle having interior orifices to produce a filler cream composite rope having a leading edge, and having a continuous interior image defined by the coextruded first filler cream composition and second filler cream composition;
 (c) cutting the filler cream composite rope to form a filler cream unit having a top surface and a bottom surface;
 (d) contacting the filler cream unit with a first base cake; and
 (e) placing a second base cake onto the filler cream unit, thereby forming a sandwich cookie.

In some implementations, step (d) can comprise placing the filler cream unit onto a first base cake.

In some aspects, step (d) can include any suitable method of placing the filler cream unit onto a first base cake, such as depositing or allowing the filler cream unit to contact the first base cake using gravity.

In some implementations, methods of preparing a sandwich cookie comprise steps of:
 (a) providing a first filler cream composition having a first color and a second filler cream composition having a second color;
 (b) printing the first filler cream composition and second filler cream composition onto a surface to produce a filler cream composite rope having a leading edge, and having a continuous interior image defined by the first filler cream composition and second filler cream composition;
 (c) cutting the filler cream composite rope to form a filler cream unit having a top surface and a bottom surface;
 (d) contacting the filler cream unit with a first base cake; and
 (e) placing a second base cake onto the filler cream unit, thereby forming a sandwich cookie.

In further implementations, methods of preparing a sandwich cookie comprise steps of:
 (a) providing a first filler cream composition having a first color and a second filler cream composition having a second color;

(b) printing the first filler cream composition and second filler cream composition onto a first base cake to produce a filler cream layer having a continuous interior image defined by the first filler cream composition and second filler cream composition; and (c) placing a second base cake onto the filler cream unit, thereby forming a sandwich cookie.

Optional steps include the following. The first base cake, the second base cake, or both the first and second base cakes can be warmed prior to contacting the filler cream unit. When methods involve preparation of a filler cream composite rope, the diameter of the filler cream composite rope can be reduced prior to contacting the base cakes. Such diameter reduction can be accomplished in a variety of ways, including passing the filler cream composite rope through reducing funnel(s) or roller(s). Additional filler cream compositions, each with a distinctive color, can be included as desired. Methods can include slicing the filler cream composite rope with a cutting member such as an ultrasonic cutter or wire cutter, to achieve a filler cream unit of desired dimensions for inclusion in a sandwich cookie.

In some aspects, inventive concepts provide sandwich cookies wherein the continuous interior image is retained in the filler cream layer when a base cake is removed by a consumer.

Aspects of the invention will now be described in more detail.

BRIEF DESCRIPTION OF THE FIGURES

The disclosure may be more completely understood in consideration of the accompanying drawing, in which.

DETAILED DESCRIPTION

In the following description, reference is made to the accompanying drawings that form a part hereof. The drawings are provided as illustration of specific embodiments. It is to be understood that other embodiments are contemplated and may be made without departing from the scope or spirit of the present disclosure. The following detailed description, therefore, is not to be taken in a limiting sense.

Generally, when referring to the image contained within the filler cream layer, inventive concepts refer to a complex image that can depict a holiday, a celebration, an entertainment character (such as a cartoon or Disney® character), a message (such as Valentine's messages), and the like. The images are produced by coextrusion through an extrusion nozzle having interior orifices, by printing methods, or by "murine" methods, so that the created image provides detail of the desired object, for example, decorations on a Christmas tree, images and patterns within a selected flag, details of a sports team or object, and the like. The combination of coextrusion or printing, with the filler cream composition, provide a stable image that is integrated into the filler cream layer itself and retains its integrity until discovered by the consumer.

In accordance with inventive concepts, an image can be selected based upon such celebrations as a holiday, sporting event, educational activity or symbol, seasonal celebrations, images from nature, and the like. Illustrative holiday images include New Year's fireworks or decorations; Valentines hearts or messages; St. Patrick's Day shamrocks or leprechauns; Independence Day fireworks, U.S. flag; Halloween jack-o-lanterns, black cats, ghosts, haunted houses; Thanksgiving turkeys or gourds; and Christmas trees, ornaments, or characters. Sporting event images can include sporting equipment such as balls, helmets or sticks (such as hockey sticks), or indicia of sporting clubs or teams. Seasonal celebrations can include winter images such as snowflakes, snowmen, sleds; spring images such as flowers, umbrellas; summer images such as beach balls, sun images; and fall images such as colored leaves, gourds and the like. Images can be selected from characters such as cartoon characters, Disney images (for example, in anticipation of a movie release or a theme park attraction). Databases can include a limitless supply of such images for use.

In some implementations, a more complex image that requires additional image detail can be desired (for example, a black outline to the image, a whip-like tail for Mickey and Minnie Mouse, facial shading, and the like). In these aspects, an oversized filler cream composite rope can be produced and then pushed through a reducing funnel or series of reducing rollers to reduce the size of the filler cream composition rope to the desired final size for the base cakes. In some implementations, the nozzle diameter of the extruder is multiple times larger to allow for additional and more intricate final image design ports. Alternatively, printing or murine methods can produce the oversized filler cream composite rope. Optionally, the oversized filler cream composite rope can be cooled before reducing to the proper size in order to maintain image integrity and then reheated before the slicing and attaching to the bottom base cake. In some aspects, when printing methods are used to create the image, either the printing apparatus can create a finely detailed image, or an oversized filler cream composite rope can be formed by the printer. The oversized filler cream composite rope can then be reduced as discussed above.

Inventive filler cream compositions include at least a first filler cream composition and a second filler cream composition, wherein the filler cream compositions comprise substantially the same filler cream formulation with the only significant difference pertaining to the color of the individual filler cream compositions. In some aspects, more than two distinct filler cream compositions can be used, depending upon the desired final image to be created within the end product. Thus, in some embodiments, inventive filler cream composition can include a third filler cream composition, a fourth filler cream composition, a fifth filler cream composition, etc.

In producing the filler cream layer, suitable filler cream formulations, and the ingredients they contain, can differ depending upon the processing method and the finished product (sandwich cookie) the filler cream layer is to be used for. However, suitable filler cream layers generally have a number of ingredients in common, examples of which are described and illustrated in more detail below.

Suitable filler cream compositions for use in preparing filler cream layers typically comprise sweetener and an oleaginous composition.

Sweetener is the primary ingredient of a filler cream composition in accordance with inventive concepts. Illustrative sweeteners include, but are not limited to, natural sweetener such as sucrose alone, or sucrose in combination with one or more of fructose, dextrose, lactose, maltose, and other similar sugars. In some aspects, sweetener can include any one of known artificial sweeteners such as 1-aspartyl-1-phenylalanine methyl ester (commercially available as aspartame or NutraSweet™), saccharine, cyclamate and the potassium salt of 6-methyl-3,4-dihydro-1,2,3-oxathiazin-4-one-2,2-dioxide (commercially available as acesulfame-K), or a mixture of any two or more of these. Commercially available sugars, such as fine granulated table sugar, or 4×, 6×, 10× or 12× sugars or mixtures of sugars may be used in accordance with inventive concepts. In some embodiments, coarse sugars can be ground to provide a finer particle size.

When an artificial sweetener is used, inventive filler cream compositions can include a bulking agent such as polydextrose, isomalt, isomaltulose, polyglucose, polymaltose, carboxymethyl-cellulose, microcrystalline cellulose, cellulose gel, arabinogalactan, and mixtures of any two or more of these.

The "oleaginous composition" refers to the oil or fat used in filler creams. In accordance with inventive concepts, the oleaginous composition can include a single oil or fat, or a mixture of oils and/or fats. Desirable oleaginous compositions used in filler creams for sandwich cookies are firm, but soft at ordinary storage temperatures. The solid fat index (SFI) of the oleaginous composition can be important to development of desirable qualities of the filler cream.

Suitable oleaginous compositions that may be used include any known fat blends or fat compositions used to produce filler creams. Hard and soft fats, shortenings, oils, and mixtures thereof may be used to achieve a desired consistency or melting profile in the finished filler cream. Exemplary edible triglycerides that can be used in the oleaginous compositions include naturally occurring triglycerides derived from vegetable sources such as soybean oil, palm kernel oil, palm oil, rapeseed oil, safflower oil, sesame oil, sunflower seed oil, cotton seed oil, coconut oil, and mixtures thereof. Marine and animal oils such as sardine oil, menhade oil, babassu oil, lard and tallow can also be used. Synthetic triglycerides as well as natural triglycerides of fatty acids may also be used to obtain the oleaginous compositions. Fatty acids may have a chain length of about 8 to about 24 carbon atoms.

Suitable oleaginous compositions are firm, but soft or "spreadable" at ordinary room temperatures. Suitable shortening, fat or oils can be modified by being partially hydrogenated, fractionated, and interesterified so as to obtain an oleaginous composition having a desired solid fat index (SFI).

Optionally, the amount of oleaginous composition can be reduced (to provide a reduced fat product) by replacing an amount of the oleaginous composition with a polyol (such as glycerol). The polyol can include straight or branched chain edible hydrocarbons containing at least two hydroxyl groups on the carbon skeleton. The polyols can include other functional groups such as double bonds or carboxyl groups. Polyols that are in liquid form at temperatures used to melt the oleaginous composition can be particularly useful to facilitate mixing of ingredients. Illustrative polyols include glycerin or glycerol, propylene glycol, mannitol, and mixtures of any two or more of these. Sugar alcohols such as sorbitol, hydrolyzed starch hydrolyzates such as Lycasin® (which comprises sorbitol and various hydrogenated polysaccharide compounds), high fructose corn syrup, and corn syrup can be used.

In some aspects, emulsifiers can be included to reduce or avoid polyol and fat separation. Emulsifiers can also assist in the incorporation of sugar and other ingredients into an oleaginous composition. Illustrative emulsifiers include polyglycerol esters, or monoglycerides. Illustrative monoglycerides include those from unsaturated fatty acids, for example, monoglycerides derived from canola or low erucic rape seed oil, cottonseed oil, sunflower oil, soybean oil, palm oil, vegetable oil, or mixtures thereof.

In addition to emulsifier, other optional ingredients include flavoring, stiffening agent, processing aid, stabilizer, antioxidants, and salt.

Such optional ingredients are selected to not adversely impact image integrity, formability, set-up time, softness, and/or smoothness of the filler cream layer.

Filler cream compositions can include one or more flavorings, such as vanilla, chocolate, coffee, peppermint, strawberry, raspberry, blueberry and the like. Numerous suitable flavorings and extracts are commercially available. In some aspects, at least one flavoring is vanilla.

Illustrative stiffening agents include non-fat milk powder, whey powder and the like. Illustrative processing aids include lecithin. Illustrative stabilizers include dextrose, edible fused silica, and the like.

Antioxidants can reduce or prevent development of undesirable flavors, odors and/or colors in the filler cream.

In some implementations, an extrudable filler cream composition can be formulated so as to be extrudable or printable at typical production rates while also offering acceptable properties to the end product, such as mouthfeel of the cream filler layer, adherence to base cakes, and the like. Selection and ratios of the above ingredients can be modified to provide filler cream compositions that are neither too sticky to extrude or print, nor too fluid to be retained within a sandwich cookie. The amount of stirring or agitation of the filler cream composition should be controlled to minimize liquidation of the composition. Thus, the speed and duration of mixing or agitation should be controlled to maintain a processing viscosity that is useful in the methods described herein, and to provide a stable interior image.

In accordance with inventive concepts, the filler cream layer comprises a first filler cream composition having a first color, and a second filler cream composition having a second color. Optionally, additional filler cream compositions can be included, wherein each filler cream composition has a distinct color. For example, filler cream layers can include a third filler cream composition having a third color, a fourth filler cream composition having a fourth color, and so on. Once a desired image has been selected, the number of filler cream compositions with distinct colors can be determined to create the image. Coloring can be provided by any suitable food coloring. The desired number of filler cream compositions with distinct colors can be coextruded, printed, or laid up in a murine method, to provide a filler cream composite having a continuous interior image.

In some embodiments, the first filler cream composition and second cream composition can differ from each other in a different aspect as well. In these aspects, the formulation of the distinct filler creams can be selected to be different, to provide an additional level of novelty to the filler cream layer. In one example, a peppermint flavoring can be included in a first filler cream composition that has a green coloring, and a second filler cream composition having a white or red color can include a different flavor (such as chocolate, strawberry, cinnamon, or vanilla). The first and second filler cream compositions can then be coextruded to prepare a filler cream layer containing a Christmas image having multiple flavors within the filler cream layer. In another example, the level of sweetener or other ingredient within a selected filler cream composition used to create the interior image can differ, to provide a filler cream layer having different textures or sweetness levels within the product.

In accordance with inventive concepts, filler cream compositions can be prepared by first heating an oleaginous composition to a desired temperature (for example, in a range of about 105° F. to about 135° F.). Non-sugar ingredients, such as flavorings, stiffening agents, and the like, are added to the heated oleaginous composition. Next, sugar is added with mixing, to form a suspension (sugar is not dissolved at this stage of the process).

The above combination is aerated (air sparging) and mixed simultaneously. As the aeration process begins, the temperature of the combination is reduced to promote crystallization of the oleaginous composition for formation of the filler cream composition. Typically, the temperature is reduced to below about 80° F., or below about 78° F. In some implementations, temperature reduction occurs within approximately five (5) minutes and can be performed in a mixing machine having three or more distinct temperature reduction zones.

In some implementations, when the amount of oleaginous composition is reduced (for example, a reduced fat or fat-free product), a slightly modified process can be utilized. In these aspects, oleaginous composition is premixed with emulsifier prior to addition of polyol. The polyol is then added with mixing to obtain a substantially lump-free homogeneous emulsion. The emulsion is then admixed with at least one sugar at a temperature that is sufficiently low so as to avoid separation of the oleaginous composition and the polyol. The mixing may be performed to obtain a substantially homogenous slurry into which air is injected. The mixture can be held until the temperature of the mixture returns to the temperature range of about 105° F. to about 135° F. The oil mixture and the sugars are then combined and admixed with heating at a temperature in a range to avoid lumping and separation of the polyol and oleaginous composition, while maintaining viscosity that permits downstream pumping and aeration. The slurry and air are admixed with cooling to obtain a filler cream composition having a desired specific gravity for the application.

Inventive concepts include a method for preparing a sandwich cookie that includes a hidden, predetermined complex image within the filler cream layer. These aspects will now be described in more detail.

In some implementations, a first filler cream composition having a first color, and a second filler cream composition having a second color, are coextruded to cooperatively define a continuous interior image from the top surface to the bottom surface of the filler cream layer. Once an image is chosen, an extrusion nozzle is selected based upon the desired image to be provided within the filler cream composite. The image is thus "predetermined" in that it is established in advance, and the extrusion nozzle is selected to create that image within relatively tight tolerances. The extrusion nozzle includes balanced intake ports that fit supply line ends that in turn feed the filler cream compositions having the selected color profile into the extrusion nozzle. The feed lines are balanced for the filler cream composition to maintain the same pressure from one color to the next color, so that the final image exits the extrusion nozzle as a complete unit within tight tolerances. Within the extrusion nozzle, finer details of the image may require a reduced pressure to accommodate the smaller fields within the overall image. These smaller fields of the image will have a higher back pressure relative to larger fields. In a similar manner, larger details of the image (such as background or larger fields of the image itself) may be provided with a relatively higher pressure, since the area within the extrusion nozzle is larger, and these larger fields will experience a loss in pressure during extrusion.

In some aspects, the pressure through the various feed lines and into the extrusion nozzle are balanced to maintain laminar flow of the filler cream composition through the extrusion nozzle. In these aspects, the first filler cream composition, second filler cream composition, etc. travel smoothly or in regular paths during extrusion. In laminar flow (sometimes referred to as streamline flow), the velocity, pressure and other flow properties at each point in the fluid stream remain constant. This is in contrast to turbulent flow, in which the filler cream composition could undergo irregular fluctuations and mixing during extrusion. In some aspects, therefore, inventive concepts provide extrusion of filler cream compositions that reduces or avoids turbulent flow.

The extrusion nozzle includes interior orifices that define an image; as the filler cream compositions pass through the interior orifices, they cooperate to define an image. The coextrusion of first filler cream composition, second filler cream composition (and optional additional filler cream compositions, as desired) exit through the image ports at the same speed and pressure to give the final design of the extrusion nozzle to complete the filler cream composite rope that contains the image.

Figure 1:
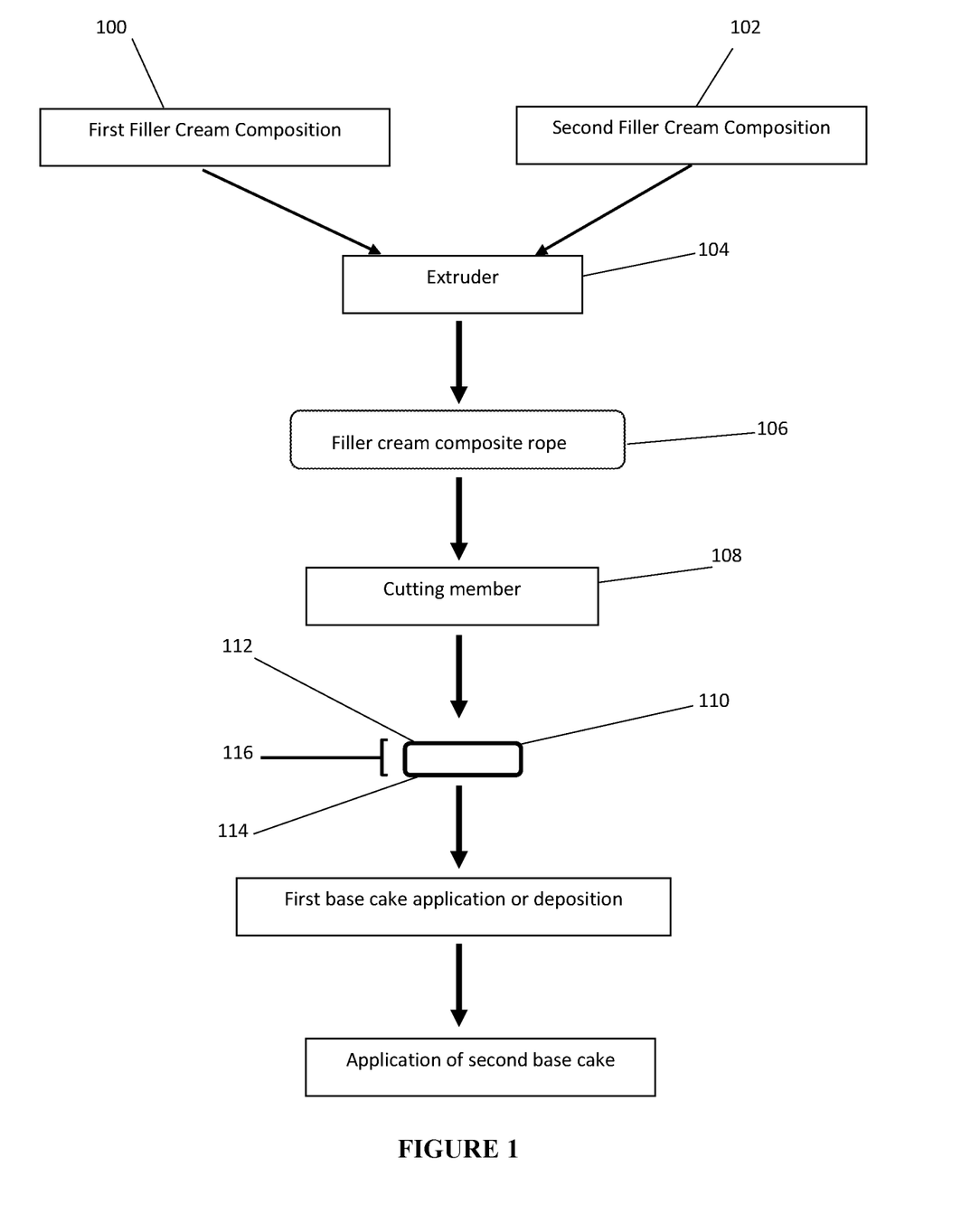
FIG. 1 is a schematic of a process in accordance with inventive concepts.

One method for preparing a sandwich cookie that includes a continuous interior image within the filler cream layer is schematically illustrated in FIG. 1. Generally speaking, a first filler cream composition 100 and second filler cream composition 102 are provided. The first filler cream composition 100 and second filler cream composition 102 are provided having different colors, but are otherwise identical in formulation. In some aspects (and as described elsewhere herein), the first filler cream composition 100 and second filler cream composition 102 can be provided in different colors and with different formulations. For example, second filler cream composition 102 can be provided with a modified formulation that changes the identity or level of a particular component (e.g., sweetener and/or flavor).

First filler cream composition 100 and second filler cream composition 102 are concurrently fed into an extruder 104. Extruder 104 can be of a conventional design used in the food industry, such as those manufactured by Unifiller Systems, Inc. (Canada), and the like. Within the extruder 104, first filler cream composition 100 and second filler cream composition 102 are extruded through an extrusion nozzle. The extrusion nozzle includes various interior orifices such that a continuous filler cream composite is formed as a rope 106 that includes an interior image as the filler cream compositions pass through the extrusion nozzle. The operation of the extruder and consistency of the filler cream compositions are selected by operators and are within the knowledge of skilled artisans. Details of operation of the extruder are also well known, and illustration of the extruder is schematic.

Filler cream composition feed rates can be adjusted so that a desired volume of a specific filler cream composition can be supplied to feed a larger volume of that filler cream composition to provide a desired proportion of the filler cream compositions used. Extruders are operated to maintain laminar flow, so that a continuous, complex image is formed from the multiple filler cream compositions supplied to the extruder.

As the extrusion process forms the filler cream composite rope 106, the first filler cream composition and second filler cream composition form the desired interior image continuously throughout the length of filler cream composite rope 106 as dictated by the extrusion nozzle. It is understood that the extruder 104 can include any desired number of extrusion nozzles such that a multiplicity of filler cream composite ropes can be formed concurrently based upon production requirements. In accordance with inventive concepts, the filler cream composite rope 106 includes a sharply defined interior image that is continuous throughout the length of the rope 106.

The extruder nozzle is fabricated to include interior orifices that define an image. In use, a desired image is selected, such as a flag. An extruder nozzle is fabricated to include the number of interior orifices to correspond to the colored components of the flag (for example, stripes, stars and a flag pole). In some aspects, the extruder nozzle can be fabricated by 3D printing. In practice, a cookie producer can maintain a collection of extruder nozzles to create any number of fanciful images for use in sandwich cookies.

As filler cream composite rope 106 exits the extruder 104, the filler cream composite rope 106 can optionally be directed through a cooling tunnel. When utilized, the cooling tunnel can cool the filler cream composite rope 106 such that deformation of the filler cream composite rope 106 and its interior image are prevented during further processing steps.

Optionally, the filler cream composite rope 106 can be directed through a sizing chamber. Laminar flow is important in maintaining the integrity and clarity of the internal image, as the filler cream composite rope moves through the sizing chamber. When used with a reducing sizing chamber downstream of the extrusion nozzle, the extrusion nozzle can be large, to permit the filler cream composite to form an interior image. Changing the size of the filler cream composite rope 106 with smoothly decreasing size cone sizing chamber, can maintain the definition of the interior image while changing the overall size of the filler cream composite rope 106. The proportions of the interior image remain the same, but the overall size of the filler cream composite rope 106 is reduced. This can be particularly useful when creating more intricate interior images within the filler cream for use within a sandwich cookie.

In the coextrusion process the first filler cream and second filler cream are extruded simultaneously to form a filler cream composite rope 106 that exits the extrusion nozzle. Filler cream units 110 are separated from the filler cream composite rope 106 by cutting member 108. Cutting member 108 can comprise any suitable cutting assembly, such as a cutoff wire or iris, knife, guillotine, mechanical or reciprocating wires, blades, and the like. Cutting member 108 selectively slices filler cream composite rope 106 to form a filler cream unit 110 of desired dimensions. The cutting member 108 is selected to maintain the proportions and clarity of the interior image. In some aspects, the cutting member can employ an ultrasonic cutter that has increased ability to reduce or avoid smearing of the various filler cream compositions.

The result is a filler cream unit 110 of sufficient dimensions to be included within a sandwich cookie. The filler cream unit 110 has a diameter that is equal to, or less than, the diameter of base cakes to be used for the sandwich cookie. Typically, the diameter of the filler cream unit is less than the diameter of the base cakes. Filler cream unit 110 has a top surface 112, bottom surface 114 and thickness 116. The interior image is visible at the top surface 112, the bottom surface 114, and throughout the thickness 116 of the filler cream unit 110. In some aspects, and as discussed in more detail below, the interior image can be visible at locations around the perimeter or sides of the filler cream unit 110. Moreover, the proportions and clarity of the interior image is continuously maintained throughout the thickness 116 of the filler cream unit 110. Thickness 116 of the filler cream unit 110 can be selected to accommodate the desired end product.

Sandwich cookies can be assembled in conventional manner by depositing a slice, or layer, of the filler cream composition onto a first cookie base cake, and depositing a second cookie base cake onto the filler cream layer to obtain a sandwich, then cooling the sandwich. These aspects will now be described.

In some implementations, a base cake can be held by a robotic arm with a vacuum cup and pressed onto the end of a filler cream composite rope prior to cutting the rope. Next, the end of the filler cream composite rope containing a base cake end cap is cut and placed on a conveyor and cooled. After sufficient cooling, a second base cake is then placed on the base cake/filler cream unit combination to complete the sandwich cookie. In this particular embodiment, cooling of the first base cake/filler cream unit combination allows the first base cake to adhere more strongly to the first base cake. This creates a separation preference for the second base cake, such that when a consumer applies twisting action to the two base cakes, the second base cake separates more easily and cleanly from the filler cream layer. In some embodiments, this can provide enhanced integrity and clarity of the hidden image contained in the filler cream layer.

In other implementations, filler cream units can be deposited onto first base cakes presented on a conveyor (or similar surface), cooled, and a second base cake can be applied to the first base cake/filler cream layer. Deposition of the filler cream units can be achieved using any suitable mechanism. For example, a filler cream depositor that applies a filler cream to a first, lower base cake can be used. In some aspects, the filler cream depositor can comprise a tubular shaft that is positioned above base cakes. Upon exiting the depositor, the cutting mechanism can separate a filler cream unit from the filler cream composite rope. First base cakes can be provided on a conveyer system underneath the cutting mechanism, such that the filler cream unit is deposited onto the first base cake. The distance from the cutting mechanism and the first base cake can be selected such that it minimizes distortion of the filler cream unit (and contained image), and maximizes deposition accuracy.

The second (top) base cake is deposited onto the filler cream layer and does not contact the first (lower) base cake. Various known mechanisms can be used to maintain placement and alignment with respect to the two base cakes of the final sandwich cookie product.

Figure 2:
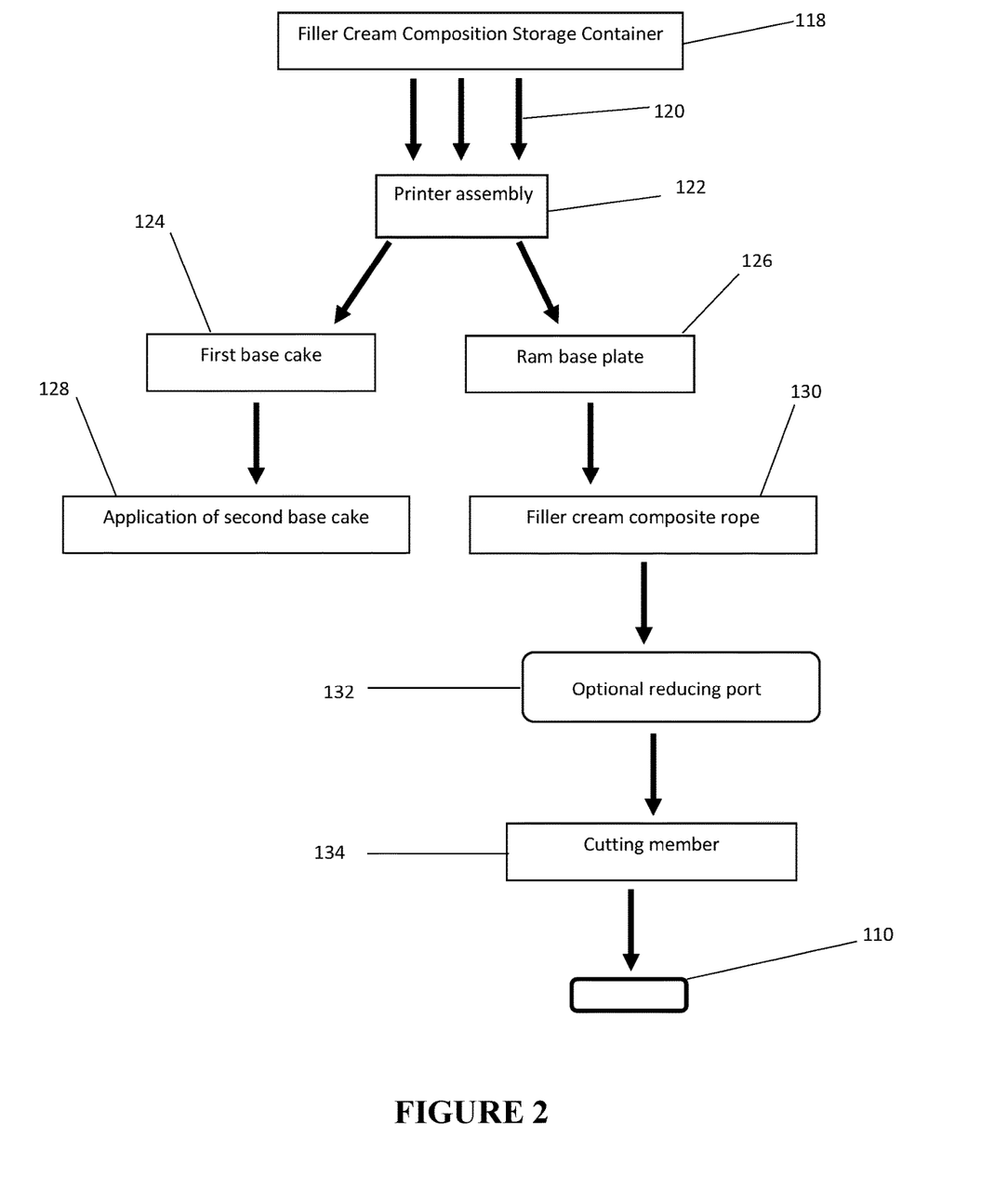
FIG. 2 is a schematic of a process in accordance with inventive concepts.

In some implementations, methods for preparing a sandwich cookie can utilize a "printing" method to prepare a filler cream composition that includes a predetermined image therein. In these aspects, filler cream composition can be applied using a digital imaging printer, such as an ink jet printer (e.g., thermal bubble jet, piezoelectric drop on demand, continuous ink jet or the like), which is of a conventional type. Referring to FIG. 2, filler cream composition is pumped from a filler cream composition storage container 118 through supply lines 120 to an assembly of printer heads (collectively forming printer assembly 122)

that each apply an individually colored filler cream composition. The printer assembly 122 deposits miniature droplets of two or more filler cream compositions onto a surface. The surface can comprise a first base cake 124 (for single cookie production) or a ram base plate 126 (a surface used to accumulate filler cream composition into a filler cream composite rope 130). Optionally, when the surface comprises a ram base plate 126, the ram base plate can be used to force the completed filler cream composite rope 130 through a reducing port 132 to condense the image and reduce the filler cream composite rope to a desired size for the base cake. The filler cream composite rope 130 is passed through a cutting member 134, to provide a filler cream unit 110 of sufficient dimensions to be included within a sandwich cookie. The filler cream unit 110 is as described elsewhere herein. The two or more filler cream compositions can differ in terms of color, flavor, texture, or any other desired feature or combinations of features, as discussed elsewhere herein.

When printer assembly 122 deposits droplets of filler cream compositions onto first base cake 124, the filler cream droplets are deposited until a sufficient amount of filler cream composition has accumulated on the first base cake 124 to provide a filler cream unit 110 of sufficient dimensions to be included within a sandwich cookie. Filler cream unit 110 is as described elsewhere herein. Once the filler cream unit 110 is complete, a second base cake 128 can be applied to complete the sandwich cookie.

In these aspects, main components of the apparatus include pumps (to supply the filler cream composition to the filler composition printer assembly), the supply lines from the pump to the printer heads of the printer assembly, the printer assembly itself, and a computer controlled apparatus to accurately move the printer heads to their precise locations as the printer assembly deposits filler cream composition to create the design on either the first base cake or onto the ram base plate (creating the much larger filler cream composite rope).

The pumps, one for each feature (color and/or flavor, and the like) are configured to pump the filler cream composition at a range of temperatures at a high pressure but a low feed rate. In some implementations, pumps comprise positive displacement pumps (e.g. Ampco Pumps Company "ZP Series") that have supply and pressure enough to teed multiple printer assemblies. In some implementations, pumps comprise a pressure vessel filled with the desired colored filler cream composition with a ram on one end to supply the feed and the pressure needed, and an outlet port on the opposite end that leads through the supply lines to the printer assembly.

The supply lines (e.g. PVDF "Kynar") tubing are configured to be flexible and designed for constant rapid motion with little resistance to the motion. Typically, the supply lines are rated for high pressure but low flow. The end of each supply line include quick-connects for easy cleaning and replacement.

The printer assembly consists of a small diameter tube (+/−1 mm) that has a solid piston shaft that moves freely inside the printer assembly tube. The end of the piston shaft nearest the outlet end of the printer assembly has a flat tip and the opposite end of the piston shaft has a threaded connection to the shaft of a direct drive linear motor with encoder (e.g. Moticont SDLM-019-070-01-01). The printer assembly tube is connected by threaded fitting to the body of the direct drive linear motor with encoder. The linear motor is driven by a Servo Motor Driver or similar digital drive system.

The filler cream composition feed tube is fitted to the side of the printer assembly tube securely by weld, solder or braze near the end of the outlet tube (approximately three times the interior diameter away from the outlet end of the tube directly over the injection hole that has a diameter of the inside diameter of the jet point tube). The filler cream composition feed tube runs alongside the printer assembly tube and linear motor, and the inlet end has a quick-connect for the supply lines.

In operation, the solid piston shaft starts at the "normally closed" position, (shaft fully, extended to approximately one times the diameter of the interior of the printer assembly tube). When the filler cream composition is to be laid, the solid piston shaft is drawn up the printer assembly tube by the linear motor, past the injection hole to a desired point and then the linear motor reverses direction and rapidly advances to close the opening at the injection hole and release the filler cream composition droplet out of the end of the printer assembly tube onto the base cake or ram base plate. The act of the solid piston shaft receding past the opening of the injection hole causes the pressurized filler cream composition to enter the jet point tube to an amount until the linear motor reverses and causes the solid piston shaft to close the hole (acting as a metering valve that is controlled by the dwell time the hole is open and the hole is left open by the distance the solid piston shaft is drawn back up the printer assembly tube).

Optionally, the computer-controlled apparatus can consist of a 3-D printer driving individual jet assemblies, one or more robotic arms driving a series of printer assemblies picking individual colors off a holding rack as needed, or a combination of the above. These can be plotted through computer programs to direct the position and color of each printer assembly to produce the desired image and final size of the filler cream composite rope, or the design on each individual base cake.

In some implementations, methods of preparing a sandwich cookie can utilize concepts used to prepare murine in the glass arts. Murine, which is used to create millefiori, is glass art made by combining thin colored glass rods together to form an image in the cross section of the rod bundle. This bundle of glass rods is much larger than the desired glass bead that will be produced when the rods are fused with heat. The bundle is then drawn to the desired size of bead while retaining the image in cross section (and even condensing the image to greater clarity in some instances).

In accordance with these aspects of the invention, two equal halves of a cylinder divided lengthwise are utilized to collect strips of filler cream composition used to create the predetermined image. The two halves of cylinder can be conceptualized as a top portion and a bottom portion. This same cylinder when the halves are combined supplies the extruding chamber for the laid-up combinations of colored strips to be pressed to form the filler cream composite rope with image. The strips of various colored filler cream compositions are laid down in sequence according to a computer program, a drawing schematic or any other method to derive the desired image. These colored filler cream composition strips are laid down into the bottom half of the extruding cylinder by an extruding pump and nozzle system. The nozzles (separate pumps and nozzles for each color of filler cream composition) typically have a square tip of a set size to keep the empty space between strips to a minimum. The tip may also be a portion of the set size square (such as a bisected angle portion of a square as long as there is a corresponding angle portion to complete the square). The use of portions of a square tip will enhance the accuracy of a given image. For example, if the computer layout of the image or graph paper superimposed over an image were in ⅛" squares, the tip generally would be ⅛" square and thus the laid-up strips would also be ⅛". The strips are individually laid until the bottom half of the image is complete and the bottom half of the cylinder is full. Likewise, the top hemispherical half of the image is created to complete the full circular bundle of filler cream composition and have the desired image. The top half of the extrusion cylinder is then fastened in place on the bottom half of the extrusion cylinder. The piston then enters the rear of the cylinder (piston can be driven hydraulically, screw drive, mechanically or by any other means appropriate) and can proceed to press the filler cream composite rope through the reducing funnel or reducing rollers or any other means by which to evenly reduce the size of the filler cream composite rope and retain the image until it achieves the size specified for a cookie filler cream unit. Once the filler cream unit having the desired dimensions is produced, sandwich cookies can be formed using the methods described herein.

In practice, the filler cream composition in accordance with these aspects is extruded one "pixel" at a time of an image. For example, when preparing an image of a Christmas tree that is 6 inches in diameter, the image is first divided into ⅛-inch square divisions. Each division is plotted into a computer program and this program instructs an extruder to lay a ⅛-inch square strip the length of the filler cream composite rope (for example, 4 feet long). Once the filler cream composite rope is completed with all of the strips, the composite rope is then pressed through a reducing port, pulled, or elongated through a series of rollers to achieve the desired diameter of a filler cream unit. This reduced filler cream composite rope is then cooled and sliced, and each slice is placed on a slightly surface heated biscuit and capped with a second surface heated biscuit to complete the sandwich cookie, as described elsewhere herein.

Figure 3:
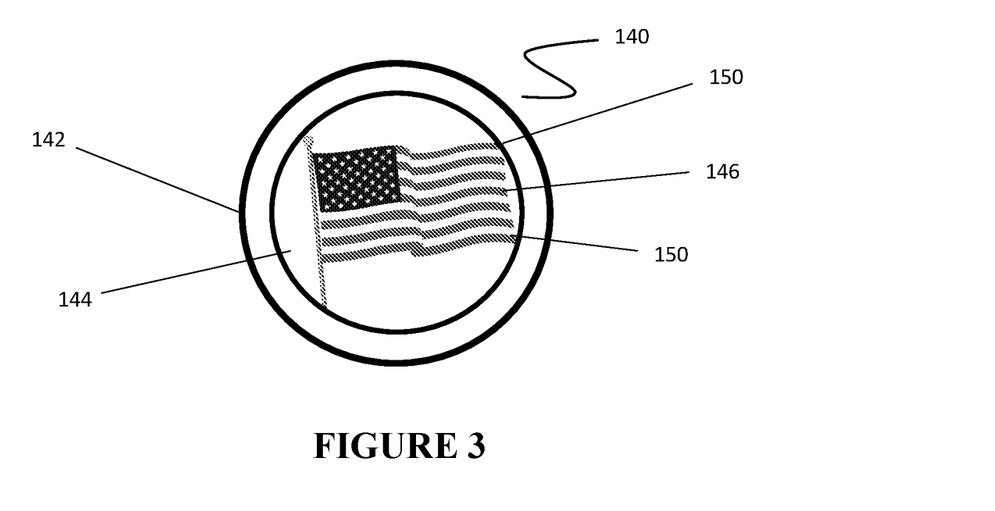
FIG. 3 is a partial top view of a sandwich cookie in accordance with an embodiment of the invention.
Figure 4:
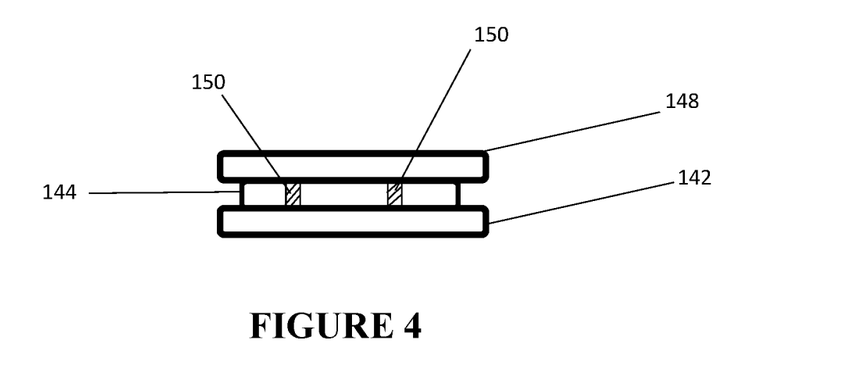
FIG. 4 is a side view of the embodiment illustrated in FIG. 3, further including a second base cake to complete a sandwich cookie.

Referring to FIG. 3, a partially assembled sandwich cookie 140 is illustrated. Partially assembled sandwich cookie 140 includes base cake 142 and filler cream unit 144. As illustrated, filler cream unit 144 includes a colored, detailed image 146 of the U.S. flag. The image 146 contacts the perimeter of filler cream unit 144 at locations 150. FIG. 4 shows a side view of the sandwich cookie of FIG. 3, with a second base cake 148 applied to complete the cookie. Once the second base cake 148 is applied, the sandwich cookie is completed, having the filler cream unit 144 located between two base cakes and image 146 "hidden" from view by the base cakes 142 and 148. As illustrated in FIG. 4 however, locations 150 where the image contacts the perimeter of filler cream unit 144 provide a hint of the interior image contained within the sandwich cookie, and an enticement to discover the full image.

Figure 5:
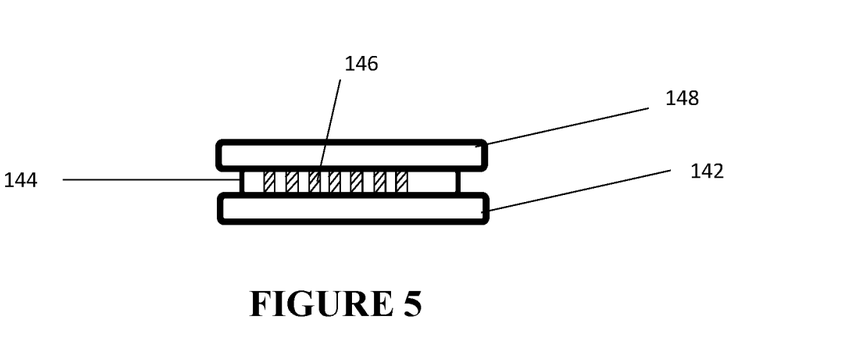
FIG. 5 is a cross section view of the embodiment illustrated in FIG. 4.

FIG. 5 is a cross-section of the embodiment illustrated in FIG. 4 and shows the continuous nature of the image 146 throughout the filler cream unit 144. As illustrated, the individual stripes of the flag shown in FIG. 3 are visible throughout the thickness of the filler cream layer 144 of the sandwich cookie 140.

Finished sandwich cookies can then be packaged with random other images from a desired set so as to create an assortment of images in one package to add to the fun factor.

In accordance with inventive concepts, a variety of base cake formulations can be used in combination with inventive filler cream layers. In some aspects, a soft base cake can break apart more easily when eaten by a consumer. In other aspects, a hard base cake can resist breakage and cause a filler cream layer to be squeezed out of the sides of a sandwich cookie.

In some implementations, base cakes can be prepared by combining flour, high fructose corn syrup, sugar, corn oil, flavoring (dutched cocoa and vanilla), corn syrup, dextrose, eggs, salt, sodium bicarbonate, lecithin, ammonium bicarbonate and water. Ingredients are mixed well, molded, baked and cooled.

Optionally, base cakes can include a film or wax coating to the surface that comes into contact with the filler cream layer. In these aspects, the film or wax coating can act as a barrier to any oil migration from the filler cream layer into the base cakes. Such film or wax can also aid in removal of one or both of the base cakes, thereby enhancing the ability of the filler cream unit to maintain the integrity of its interior image when a consumer removes a base cake during the eating experience.

Suitable filler cream compositions and base cakes are described, for example, in U.S. Pat. No. 4,711,788 (Porcello et al.); U.S. Pat. No. 4,834,991 (Porcello et al.); U.S. Pat. No. 4,865,859 (Porcello et al.); U.S. Pat. No. 5,374,438 (Yost); and U.S. Pat. No. 5,612,078 (Fileti).

Other base cake formulations can be utilized in combination with inventive filler cream compositions, including other cookie base cakes, biscuits, or crackers.

Where used in the figures, the same numerals designate the same or similar parts.

All publications and patents mentioned herein are hereby incorporated by reference to the same extent as if each individual publication or patent was specifically and individually indicated. The publications and patents disclosed herein are provided solely for their disclosure. Nothing herein is to be construed as an admission that any publication and/or patent is prior art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained.

In the specification and in the claims, the terms "including" and "comprising" are open-ended terms and should be interpreted to mean "including, but not limited to." These terms are broader than, and therefore encompass, the more restrictive terms "consisting essentially of" and "consisting of."

As used herein and in the appended claims, the singular forms "a," "an," and "the" include plural reference unless the context clearly dictates otherwise. As such, the terms "a" (or "an"), "one or more" and "at least one" can be used interchangeably herein.

The invention claimed is:

1. A method of preparing a sandwich cookie comprising steps of:
   (a) providing a first filler cream composition having a first color and a second filler cream composition having a second color;
   (b) applying the first filler cream composition and second filler cream composition onto a ram base plate with a printer in a predetermined pattern to accumulate the first filler cream composition and second filler cream composition to produce a filler cream composite rope having a leading edge, and having a continuous interior image defined by the first filler cream composition and second filler cream composition;

(c) cutting the filler cream composite rope to form a filler cream unit having a top surface and a bottom surface;

(d) depositing the filler cream unit onto a first base cake; and (e) placing a second base cake onto the filler cream unit on a surface opposite the first base cake, thereby forming a sandwich cookie.

2. The method of claim 1 further comprising warming the first base cake prior to step (d).

3. The method of claim 1 further comprising warming the second base cake prior to step (e).

4. The method of claim 1 wherein the filler cream composite rope has a diameter, and wherein the method further comprises reducing the diameter of the filler cream composite rope to a desired diameter.

5. The method of claim 4 wherein reducing the diameter of the filler cream composite rope comprises passing the filler cream composite rope through a reducing funnel or rollers.

6. The method of claim 1 wherein the continuous interior image comprises a holiday image, sports image, educational image, seasonal image, nature image, or a character.

7. The method of claim 1 wherein the continuous interior image is retained in the filler cream layer when a base cake is removed by a consumer.

8. The method of claim 1 wherein step (a) comprises providing a third filler cream composition having a third color, and step (b) comprises applying the first filler cream composition, second filler cream composition, and third filler cream composition onto a ram base plate with a printer in a predetermined pattern.

9. The method of claim 1 wherein cutting the filler cream composite rope comprises slicing the filler cream composite rope with a cutting member, the cutting member comprising an ultrasonic cutter, a cutoff wire or iris, knife, guillotine, mechanical or reciprocating wire, or one or more blades.

10. The method of claim 1 further comprising using the ram base plate to force the filler cream composite rope through a reducing port.

\* \* \* \* \*